United States Patent
Coleman et al.

(10) Patent No.: US 6,709,766 B2
(45) Date of Patent: Mar. 23, 2004

(54) JOINING OF STRUCTURAL MEMBERS BY WELDING

(75) Inventors: Gary W. Coleman, Snohomish, WA (US); Terry L. Smith, Renton, WA (US); Joseph Peter Reilley, Seattle, WA (US); Warner B. Vanaken, Kent, WA (US); James H. Lee, Ravensdale, WA (US); Kevin L. Nash, Bonney Lake, WA (US); Julius J. Schaan, Bonney Lake, WA (US); Scott W. Franz, Lynnwood, WA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 10/247,879

(22) Filed: Sep. 20, 2002

(65) Prior Publication Data

US 2003/0017356 A1 Jan. 23, 2003

Related U.S. Application Data

(62) Division of application No. 09/966,969, filed on Sep. 28, 2001, now Pat. No. 6,483,069.
(60) Provisional application No. 60/237,281, filed on Oct. 2, 2000.

(51) Int. Cl.[7] .......................... B32B 7/04; B32B 15/01; B32B 15/20; B23K 15/00; B23K 26/20
(52) U.S. Cl. .................. 428/594; 428/615; 428/650; 428/660; 219/121.13; 219/121.63
(58) Field of Search ................................ 428/589, 594, 428/603, 615, 650, 660; 219/121.13, 121.45, 121.63

(56) References Cited

U.S. PATENT DOCUMENTS

3,436,515 A * 4/1969 Sayer et al.

(List continued on next page.)

FOREIGN PATENT DOCUMENTS

| DE | 38 15 068 | * 11/1989 |
| DE | 198 34 775 | * 2/2000 |
| JP | 61221330 | * 10/1986 |
| WO | 98 22251 | * 5/1998 |

Primary Examiner—John J. Zimmerman
Assistant Examiner—Jason L. Savage
(74) Attorney, Agent, or Firm—Alston & Bird LLP

(57) ABSTRACT

A method of manufacturing a structural assembly is provided. In one embodiment, the method includes the steps of providing first and second structural members having preselected shapes and dimensions. The first structural member defines a first raised portion and the second structural member defines a second raised portion. According to one embodiment, the providing step includes forming the first and second structural members into preselected shapes and dimensions. The first and second structural members can comprise plates, T-stiffeners or tubular members. The first raised portion of the first structural member is positioned adjacent to the second raised portion of the second structural member following the providing step to thereby define an interface therebetween and wherein the first and second raised portions define a substantially consumable weld land. Thereafter, the first and second structural members are irradiated with a high-energy source along the interface to thereby substantially consume the weld land and join the first and second structural members to form a structural assembly. The first high-energy source preferably comprises an electron beam or a laser.

18 Claims, 16 Drawing Sheets

U.S. PATENT DOCUMENTS

| | | | |
|---|---|---|---|
| 3,585,351 A | * | 6/1971 | Hinrichs |
| 4,213,025 A | * | 7/1980 | Kuhnen |
| 4,219,717 A | * | 8/1980 | Kuhnen |
| 4,621,185 A | * | 11/1986 | Brown |
| 4,803,334 A | * | 2/1989 | Burke et al. |
| 4,873,415 A | * | 10/1989 | Johnson et al. ........ 219/121.64 |
| 4,883,937 A | * | 11/1989 | Matsuno et al. |
| 4,905,310 A | * | 2/1990 | Ulrich ................... 219/121.64 |
| 5,250,783 A | * | 10/1993 | Nishi et al. ............ 219/121.64 |
| 5,283,415 A | * | 2/1994 | Nishi et al. ............ 219/121.64 |
| 5,284,290 A | * | 2/1994 | Moore et al. ................ 228/211 |
| 5,308,241 A | * | 5/1994 | Lemelson .............. 219/121.13 |
| 5,393,956 A | * | 2/1995 | Guth et al. ............ 219/121.64 |
| 5,479,704 A | * | 1/1996 | Richter et al. ............. 29/889.1 |
| 5,517,059 A | * | 5/1996 | Eytcheson et al. .......... 257/699 |
| 5,591,360 A | * | 1/1997 | Mombo-Caristan .... 219/121.64 |
| 5,595,670 A | * | 1/1997 | Mombo-Caristan .... 219/121.64 |
| 5,866,870 A | * | 2/1999 | Walduck ................ 219/121.45 |
| 6,284,997 B1 | * | 9/2001 | Zehavi et al. .......... 219/121.46 |

* cited by examiner

SQUARE BUTT WELD MATRIX

| PART | no. | t (in) +/-0 .005 | h (in) +/-0 .005 | w (in) +/-0 .005 | R (in) +/-0 .05 | t+h (in) +/-0 .005 |
|---|---|---|---|---|---|---|
| SBW | 1 | 0.08 | 0.060 | 0.025 | 0.250 | 0.140 |
| SBW | 2 | 0.08 | 0.050 | 0.025 | 0.250 | 0.130 |
| SBW | 3 | 0.08 | 0.040 | 0.025 | 0.250 | 0.120 |
| SBW | 4 | 0.08 | 0.030 | 0.025 | 0.250 | 0.110 |
| SBW | 5 | 0.10 | 0.060 | 0.030 | 0.250 | 0.160 |
| SBW | 6 | 0.10 | 0.050 | 0.030 | 0.250 | 0.150 |
| SBW | 7 | 0.10 | 0.040 | 0.030 | 0.250 | 0.140 |
| SBW | 8 | 0.10 | 0.030 | 0.030 | 0.250 | 0.130 |
| SBW | 9 | 0.10 | 0.040 | 0.050 | 0.250 | 0.140 |
| SBW | 10 | 0.10 | 0.040 | 0.040 | 0.250 | 0.140 |
| SBW | 11 | 0.10 | 0.040 | 0.025 | 0.250 | 0.140 |
| SBW | 12 | 0.10 | 0.040 | 0.020 | 0.250 | 0.140 |
| SBW | 13 | 0.10 | 0.040 | 0.030 | 0.300 | 0.140 |
| SBW | 14 | 0.10 | 0.040 | 0.030 | 0.190 | 0.140 |
| SBW | 15 | 0.20 | 0.070 | 0.030 | 0.250 | 0.270 |
| SBW | 16 | 0.20 | 0.060 | 0.030 | 0.250 | 0.260 |
| SBW | 17 | 0.20 | 0.050 | 0.030 | 0.250 | 0.250 |
| SBW | 18 | 0.20 | 0.040 | 0.030 | 0.250 | 0.240 |
| SBW | 19 | 0.40 | 0.140 | 0.050 | 0.250 | 0.540 |
| SBW | 20 | 0.40 | 0.120 | 0.050 | 0.250 | 0.520 |
| SBW | 21 | 0.40 | 0.100 | 0.050 | 0.250 | 0.500 |
| SBW | 22 | 0.40 | 0.080 | 0.050 | 0.250 | 0.480 |
| SBW | 23 | 0.40 | 0.060 | 0.050 | 0.250 | 0.460 |
| SBW | 24 | 0.40 | 0.100 | 0.100 | 0.250 | 0.500 |
| SBW | 25 | 0.40 | 0.100 | 0.090 | 0.250 | 0.500 |
| SBW | 26 | 0.40 | 0.100 | 0.080 | 0.250 | 0.500 |
| SBW | 27 | 0.40 | 0.100 | 0.070 | 0.250 | 0.500 |
| SBW | 28 | 0.40 | 0.100 | 0.060 | 0.250 | 0.500 |
| SBW | 29 | 0.40 | 0.100 | 0.050 | 0.300 | 0.500 |
| SBW | 30 | 0.40 | 0.100 | 0.050 | 0.190 | 0.500 |
| SBW | 31 | 0.75 | 0.250 | 0.050 | 0.250 | 1.000 |
| SBW | 32 | 0.75 | 0.200 | 0.050 | 0.250 | 0.950 |
| SBW | 33 | 0.75 | 0.150 | 0.050 | 0.375 | 0.900 |
| SBW | 34 | 0.75 | 0.100 | 0.050 | 0.190 | 0.850 |

*FIG. 6C.*

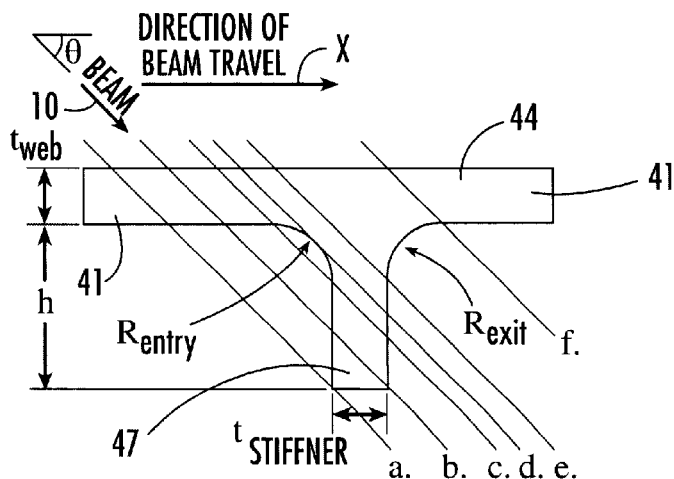
FIG. 7A.
| CUT | DESCRIPTION | PENETRATION THICKNESS |
|---|---|---|
| a. | IMMEDIATELY PRIOR TO PENETRATING | 1.4142136 |
| b. | PENETRATING WEB AND STIFFNER | 2.8284271 |
| c. | IMMEDIATELY PRIOR TO PENETRATING ENTRY RADIUS | 2.8284271 |
| d. | TANGENT TO ENTRY RADIUS (POINT OF MAXIMUM PENETRATION THICKNESS) | 3.6568542 |
| e. | IMMEDIATELY PRIOR TO PENETRATING EXIT RADIUS | 2.8284271 |
| f. | IMMEDIATELY AFTER EXITING EXIT RADIUS | 1.4142136 |
FIG. 7B.
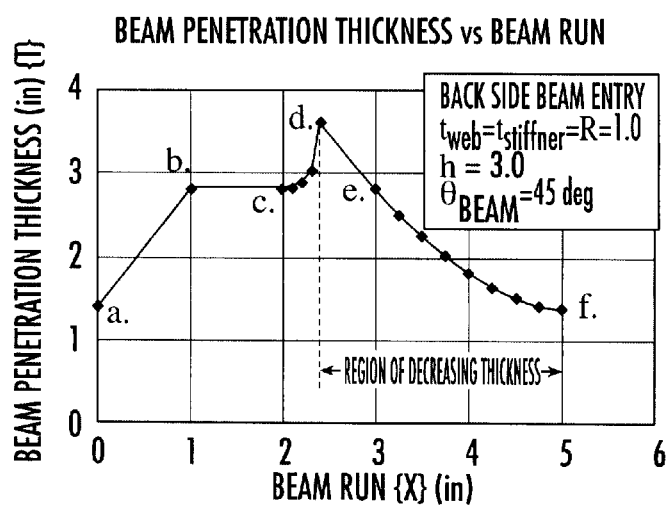
FIG. 7C.

JOINING OF STRUCTURAL MEMBERS BY WELDING

CROSS REFERENCE TO RELATED APPLICATIONS

This application is a division of U.S. patent application Ser. No. 09/966,969, filed Sep. 28, 2001 now U.S. Pat. No. 6,483,069, which claims the benefit of U.S. Provisional Application No. 60/237,281, filed Oct. 2, 2000.

FIELD OF THE INVENTION

The present invention relates to structural assemblies and, more particularly, relates to the joining of structural members by welding to form structural assemblies.

BACKGROUND OF THE INVENTION

Conventional structural assemblies, as used in the manufacture of military and commercial aircraft and missiles, are commonly formed of lightweight, high strength materials such as aluminum, aluminum alloys, titanium and titanium alloys. These assemblies are commonly constructed using a bonded honeycomb-sandwich construction or a built-up structure from structural members that are fabricated using manufacturing methods such as a machined die-forging, investment casting or hogout machining from stock material. Conventional structural assemblies formed from these types of constructions generally include large numbers of parts and fasteners that can result in extensive tooling and increased labor costs during manufacture and assembly.

During use, aircraft structural assemblies are subjected to a variety of environmental conditions, temperature variations, severe acoustic and vibration environments, all of which create mechanical and thermal stresses. Over time, the application of cyclical stresses to bonded structural assemblies can lead to disbanding at the joints, and unless repaired, it can result in mechanical failure. Due to the large number of parts and fasteners utilized in the construction of conventional structural assemblies, maintenance and repair can be time consuming and labor intensive, which can be costly over the life of the assembly. The number of total parts utilized in a bonded honeycomb or built-up structure can also increase the overall weight of the aircraft. Consequently, conventional structural assemblies are generally costly to build and maintain and can adversely affect the weight of the aircraft.

In seeking better structural assembly designs, other types of joining methods have been proposed for assembling the component parts of the structural assemblies. For example, one such alternative joining method includes full penetration electron beam welding which produces an autogenous weld. Structural members joined by electron beam welding are fused together using the heat generated by a concentrated beam of high-velocity electrons impinging on the adjoining surfaces of the structural members. The kinetic energy of the electrons is converted into heat as the electrons strike the structural members. Electron beam welding is typically conducted under a high vacuum using an electron beam gun column to create and accelerate the beam of electrons, as is known in the art. The electron beam gun column generally includes an electron gun, which is comprised of an emitter, a bias electrode, and an anode, and ancillary components, such as beam alignment, focus and deflection coils. The high-energy density in the focused electron beam produces deep, narrow welds at high speeds, with minimum distortion and other deleterious heat effects to the structural members. For example, depth-to-width ratios for electron beam welds typically range between 10:1 and 30:1 with welding speeds as high as 200 mm/s (40 ft/min). Electron beam welds exhibit superior strength compared with welds formed using other fusion welding processes.

One technique of full penetration electron beam welding is referred to as the keyhole technique in which the electron beam creates a hole entirely through the structural members to be joined. The hole created by the electron beam is subsequently filled with molten metal as the beam moves along the interface defined by the adjacent structural members. Referring to FIG. 1A, there is illustrated one embodiment of the keyhole technique. As the electron beam 10 having a diameter D is moved along the interface or joint 12 between the structural members 14a, 14b, as indicated by the directional arrow 11, the molten metal is forced around the sides of the beam from the leading side 15a to the trailing side 15b where the metal solidifies to form the weld bead 16.

As illustrated in FIGS. 1A and 1B, due to spatter, bead fall through, and/or vaporization of the metal during welding or weld shrinkage upon cooling, there may be insufficient material to completely fill the keyhole as the electron beam 10 moves along the interface 12 between the structural members 14a, 14b, which can result in regions of underfill or undercut 18 within the solidified weld bead 16. The volume of underfill or undercut 18 increases when, as illustrated in FIG. 2, the electron beam 10 moves through a section of the structural members 14a, 14b where the thickness of the structural members decreases from a thickness of $t_2$ to a thickness of $t_1$, as represented by $t_\delta$. Since the volume of material on the leading side 15a of the electron beam 10 is less than the volume of material on the trailing side 15b of the beam, there is insufficient material to fill the keyhole as the electron beam moves through the structural members.

In order to compensate for any underfilling or undercutting during electron beam welding, conventional structural members 24a, 24b are typically fabricated with a raised portion 20a, 20b along the side of each structural member to be welded, as illustrated in FIG. 3. When the structural members are positioned adjacent to one another prior to welding, the raised portions 20a, 20b collectively form a weld land 20. As illustrated by the weld profile in FIG. 3, any underfilling or undercutting during electron beam welding of the structural members 24a, 24b occurs within the weld land 20 of the structural assembly 22. Once the structural members are joined together by the electron beam, the weld land 20 is removed from the structural assembly 22 using known mechanical machining processes, such as using cutting or grinding tools, to thereby provide a structural assembly having a smooth finished surface. While the weld land 20 prevents underfilling or undercutting within the weld bead 16 joining the structural members, the formation and removal of the weld land significantly increase the material, labor and tooling costs associated with the manufacture of the structural assembly.

As a result, there remains a need for an improved method of constructing structural assemblies, which minimizes the costs associated with manufacture and assembly of the structural assemblies, as well as reduces the overall weight of the aircraft. The structural assemblies must also be capable of providing high mechanical strength and structural rigidity.

SUMMARY OF THE INVENTION

The present invention provides a method of manufacturing a structural assembly including the steps of providing first and second structural members having preselected shapes and dimensions. The first structural member defines a first raised portion and the second structural member defines a second raised portion. According to one embodiment, the providing step includes forming the first and second structural members into preselected shapes and dimensions. The forming step can include casting, forging or machining the first and second structural members. According to another embodiment, the first and second structural members comprise plates, T-stiffeners or tubular members. According to still another embodiment, the first and second structural members are formed of aluminum, an aluminum alloy, titanium or a titanium alloy. The first raised portion of the first structural member is positioned adjacent to the second raised portion of the second structural member following the providing step to thereby define an interface therebetween and wherein the first and second raised portions define a substantially consumable weld land. Thereafter, the first and second structural members are irradiated with a high-energy source along the interface to remove surface irregularities that cause stress concentrations. The first high-energy source can include an electron beam or a laser. Advantageously, the consumed weld land does not require a post-weld mechanical machining step in order to provide a finished surface.

According to another embodiment, the method of manufacturing the structural assembly includes the steps of determining the shape and dimensions of a weld land based upon the shape and dimensions of first and second structural members such that the weld land will be substantially consumable, but provide sufficient material to negate any underfill in the base geometry. The first and second structural members are then provided having the preselected shapes and dimensions. According to one embodiment, the providing step includes forming the first and second structural members into the preselected shapes and dimensions. The forming step can include casting, forging or machining the first and second structural members. According to another embodiment, the first and second structural members comprise plates, T-stiffeners or tubular members. According to still another embodiment, the first and second structural members are formed of aluminum, an aluminum alloy, titanium or a titanium alloy. The first structural member is then positioned adjacent to the second structural member following the providing step to thereby define an interface therebetween and wherein the first and second structural members define the substantially consumable weld land. Thereafter, the first and second structural members are irradiated with a high-energy source along the interface to thereby substantially consume the weld land and join the first and second structural members to form a structural assembly. Preferably, the first high-energy source comprises an electron beam or a laser.

In still another embodiment, the structural assembly is irradiated along the interface with a second high-energy source after the first irradiating step to remove any stress concentration details and thereby provide a finished surface having improved fatigue characteristics. Preferably, the second high-energy source comprises a laser. The structural assembly can then be secured to other structural assemblies to form the frame of an aircraft.

The present invention also provides a structural assembly including a first structural member defining a first surface and a second structural member positioned adjacent the first structural member. In one embodiment, the first and second structural members comprise plates, T-stiffeners or tubular members. In another embodiment, the first and second structural members are formed of aluminum, an aluminum alloy, titanium or a titanium alloy. The second structural member defines a first surface corresponding to and substantially planar with the first surface of the first structural member. The structural assembly includes a weld joint which joins the first and second structural members. Advantageously, the weld joint is formed by irradiating the first and second structural members with a high-energy source such that a surface of the weld joint is substantially planar with the first surfaces of the first and second structural members and such that no further processing of the weld joint is necessary to create the substantially planar surface of the weld joint. In another embodiment, the first and second structural members each define corresponding second surfaces. According to this embodiment, the weld joint defines a second surface corresponding to and substantially planar with the second surfaces of the first and second structural members.

Accordingly, there has been provided a structural assembly and an associated method of manufacture allowing for the efficient construction of aircraft structural assemblies, which requires less stock material and takes less time to manufacture and assemble. The resultant assemblies include an autogenous weld having high mechanical strength and structural rigidity

BRIEF DESCRIPTION OF THE DRAWINGS

The foregoing and other advantages and features of the invention, and the manner in which the same are accomplished, will become more readily apparent upon consideration of the following detailed description of the invention taken in conjunction with the accompanying drawings, which illustrate preferred and exemplary embodiments, and which are not necessarily drawn to scale, wherein:

FIG. 6C is a table listing the dimensions of square butt weld specimens for optimizing the dimensions of the consumable weld land of FIG. 6B;

FIG. 7A is a cross-sectional view illustrating the movement of an electron beam through a structural member in the shape of a T-stiffener having preselected dimensions with no weld land;

FIG. 7B is a table listing the penetration thickness T of the electron beam at various points as the beam moves along the length of the T-stiffener of FIG. 7A;

FIG. 7C is a graph illustrating the penetration thickness T measured in the beam axis plotted as a function of the distance the beam travels as it moves along the length of the T-stiffener of FIG. 7A;

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1A:
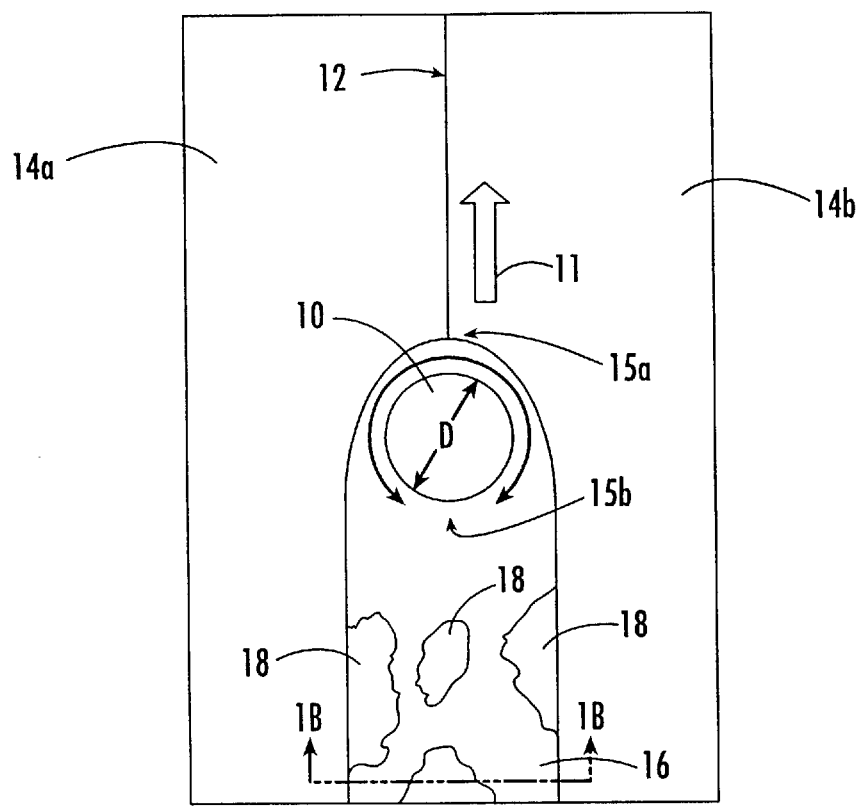
FIG. 1A is a plan view illustrating the keyhole technique of electron beam welding, as is known in the art.
Figure 2:
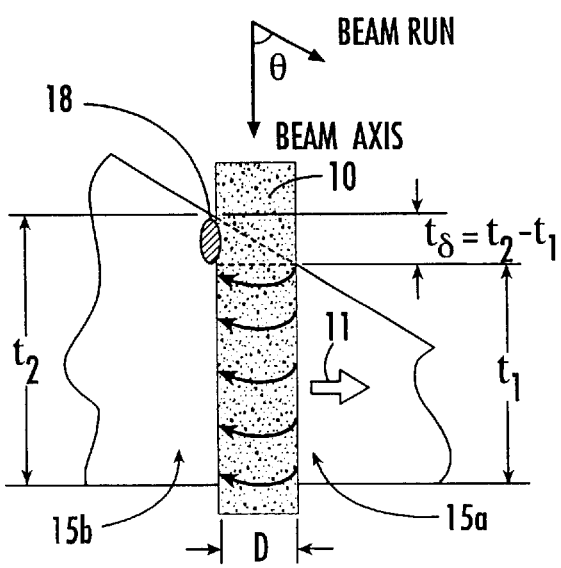
FIG. 2 is a cross-sectional view illustrating the keyhole technique of electron beam welding on adjacent structural members in which the thickness of the structural members is decreasing, as is known in the art.
Figure 1B:
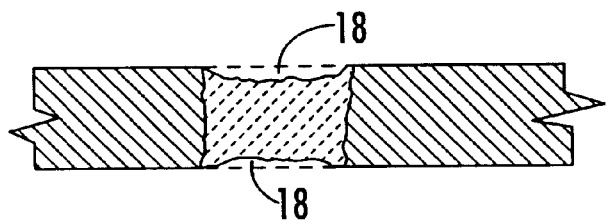
FIG. 1B is a cross-sectional view along lines 1B—1B in FIG. 1A illustrating underfilling and/or undercutting in the weld bead, as in known in the art.
Figure 3:
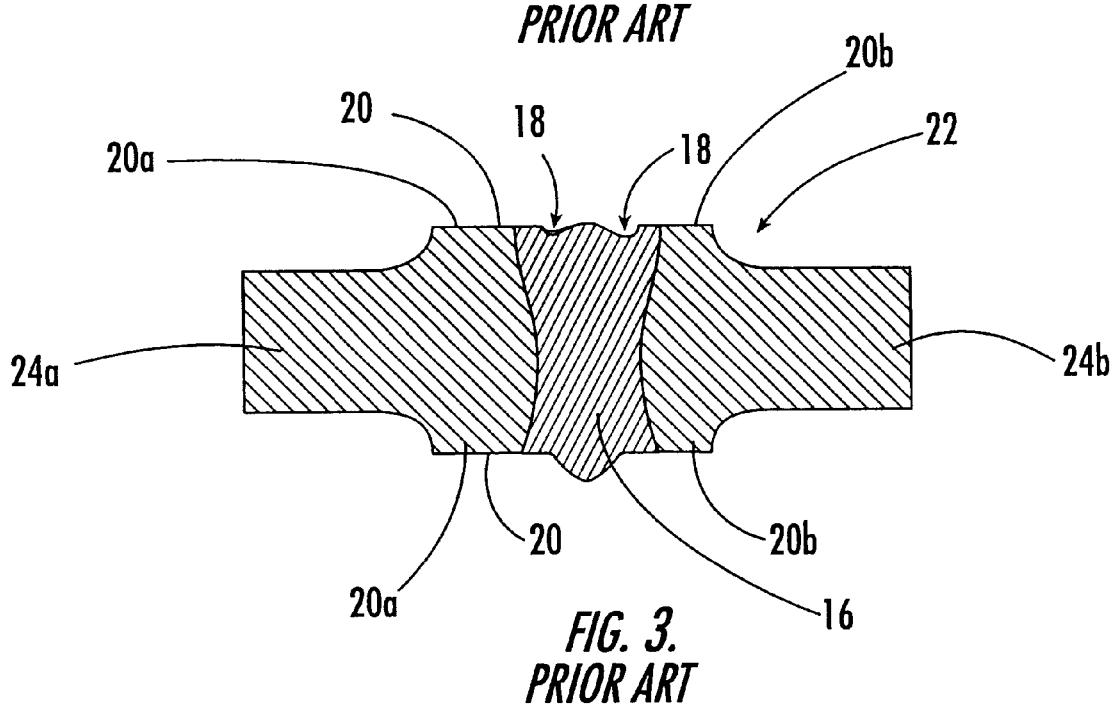
FIG. 3 is a cross-sectional view illustrating underfilling and undercutting in a weld land, as is known in the art.
Figure 4A:
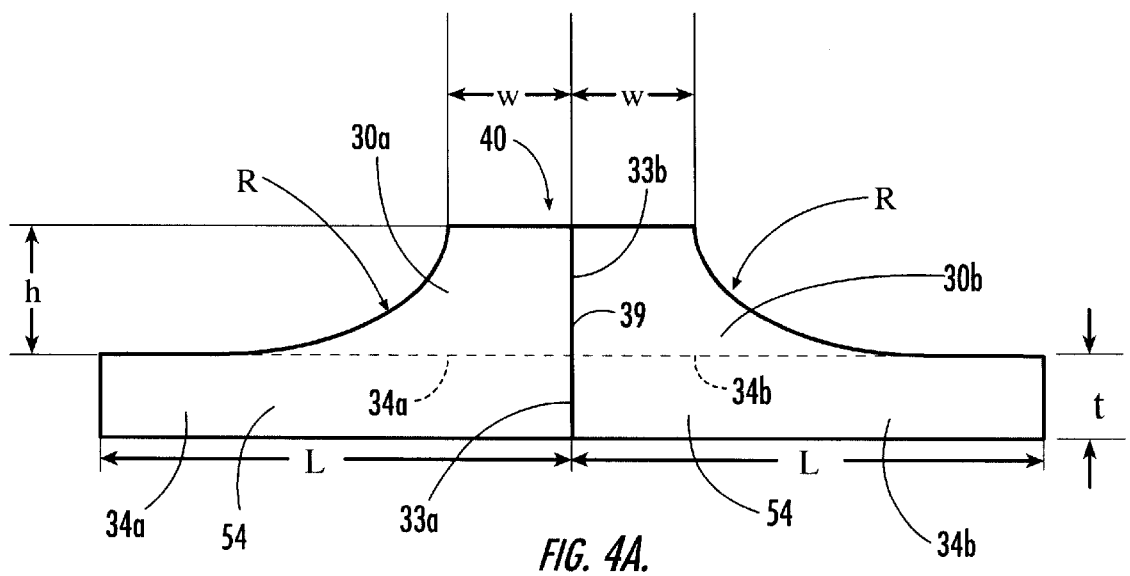
FIG. 4A is a cross-sectional view defining relevant variables and illustrating the positioning of the first and second structural members prior to electron beam welding to thereby define a substantially consumable weld land, according to one embodiment of the present invention.
Figure 4B:
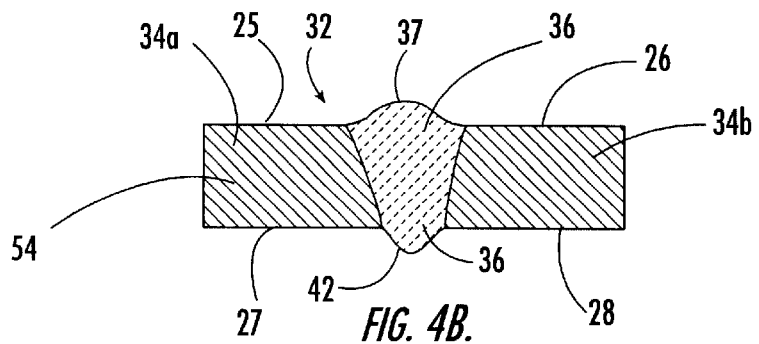
FIG. 4B is a cross-sectional view illustrating the substantially consumed weld land of a structural assembly formed by electron beam welding the first and second structural members of FIG. 4A.
Figure 4C:
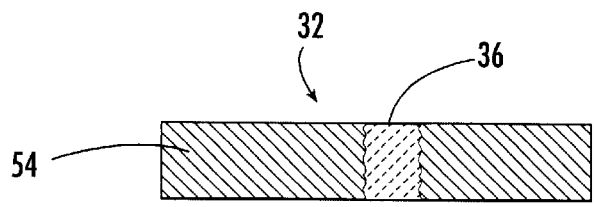
FIG. 4C is a cross-sectional view illustrating the structural assembly of FIG. 4B after undergoing laser glazing to remove any remaining stress concentration details.

Referring now to the drawings and, in particular, to FIGS. 4A, 4B, and 4C, there is illustrated the construction of a structural assembly 32, according to one embodiment of the present invention. As illustrated in FIG. 4A, the structural assembly includes first and second structural members 34a, b positioned adjacent one another. The first and second structural members are each formed into a preselected shape or configuration through known manufacturing means, such as casting, machining and/or forging. The first and second structural members 34a, b are preferably formed from a material having a high strength-to-weight ratio, such as aluminum, an aluminum alloy, titanium or a titanium alloy. In one embodiment, the first and second structural members are both formed of Ti-6Al-4 v. The shape of the first and second structural members 34a, b may vary depending upon the particular service application and required mechanical properties of the structural assembly 32. For example, the first and second structural members 34a, b can be formed into plates 54, as illustrated in FIG. 4A, T-stiffeners, as illustrated in FIGS. 5A and 5B, or into tubular configurations (not shown).

The first and second structural members 34a, b have preselected dimensions, including thickness t, length L, width (not shown). The dimensions of the structural members are likewise dependent upon the particular service application and required mechanical properties of the structural assembly 32. As illustrated in FIG. 4A, the first structural member 34a defines at least one raised portion 30a along the side 33a of the first structural member that is to be joined to the second structural member 34b. Similarly, the second structural member 34b defines at least one raised portion 30b along the side 33b of the second structural member that is to be joined to the first structural member. The location of the raised portions 30a, b along the adjoining sides 33a, b of the first and second structural members can vary depending upon the shape and dimensions of the first and second structural members 34a, b and depending upon the intensity of the electron beam or laser, as well as the welding speed. For example, the raised portions 30a, b may be located along only a select portion of the adjoining sides 33a, b of the first and second structural members, as illustrated in FIG. 4A where the first and second structural members define raised portions on only one side of each member, or the raised portions may be located along a majority or even the entire perimeter of the adjoining sides of the structural members, as illustrated in FIG. 5B where the first and second structural members define raised portions along the entire perimeter of the adjoining sides. In another embodiment (not shown), the first and second structural members each define a plurality of raised portions along the adjoining sides of the members, which raised portions are spaced from one another.

Figure 5A:
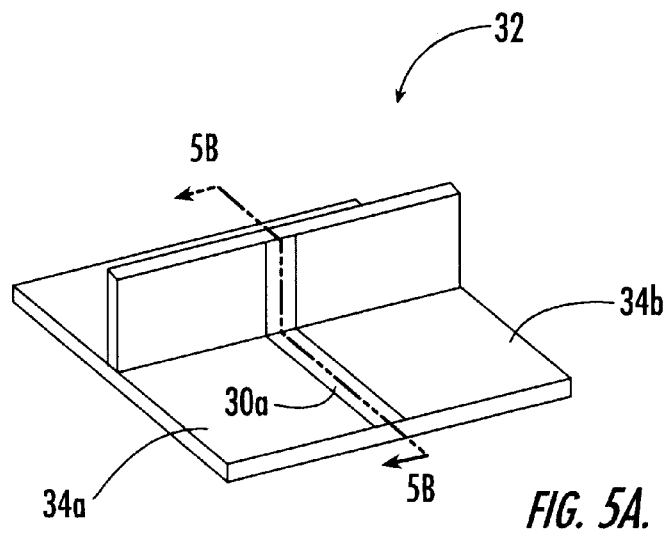
FIG. 5A is a perspective view illustrating the positioning of the first and second structural members of a T-stiffened cross section prior to electron beam welding to thereby define a substantially consumable weld land, according to another embodiment of the present invention.
Figure 5B:
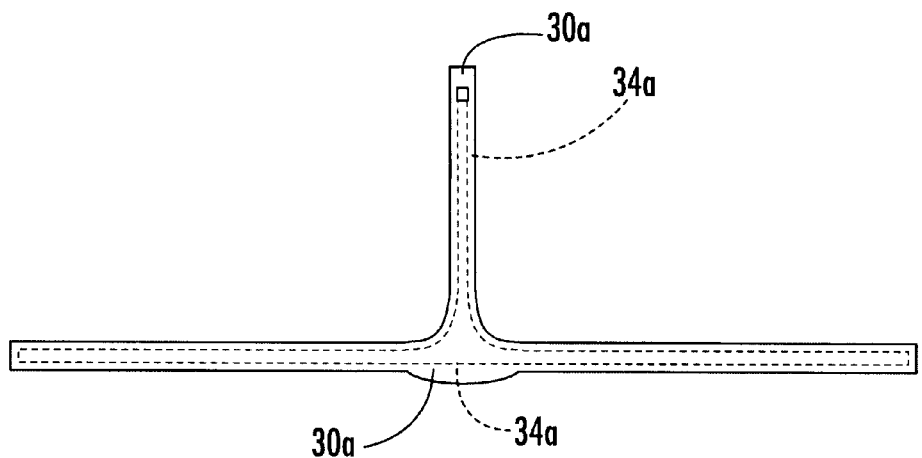
FIG. 5B is a cross-sectional view illustrating the profile of the raised portion of the first structural member of FIG. 5A.
Figure 5C:
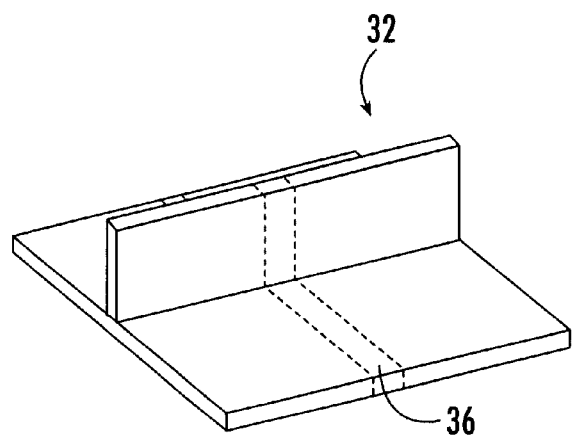
FIG. 5C is a perspective view illustrating the substantially consumed weld land of a T-stiffened structural assembly formed by electron beam welding the first and second structural members of FIG. 5A.

As illustrated in FIGS. 4A and 5A, prior to welding the first and second structural members 34a, b to form the structural assembly 32, the first raised portion 30a of the first structural member is positioned adjacent to the second raised portion 30b of the second structural member to define an interface 39 between the structural members. When positioned adjacent one another, the first and second raised portions 30a, b collectively define a consumable weld land 40. As illustrated in FIGS. 4B and 5C, a consumable weld land 40 refers to a weld land that is substantially consumed by the electron beam during welding such that the volume of material represented by the weld land is utilized to fill any underfill or undercut in the autogenous weld bead 36. The election beam can be generated from one of many commercially available electron beam welders, such as a Sciaky 60 kV/42 kW electron beam welder.

As described above, preferably the weld land 40 is consumed and the first and second structural members 34a, b are joined together using an electron beam. However, the use of an electron beam to consume the weld land 40 and join the first and second structural members 34a, b is described for purposes of illustration only and not limitation. It is considered to be within the spirit and scope of the present invention to utilize other high-energy sources to irradiate the structural members 34a, b so as to consume the weld land 40 and join the structural members, including a laser or a plasma arc.

Referring to FIG. 4B, there is illustrated a consumed weld land 40 according to one embodiment of the present invention. As illustrated in FIG. 4B, the first structural member 34a of the structural assembly 32 defines first and second surfaces 25, 27. Similarly, the second structural member 34b of the structural assembly 32 defines first and second surfaces 26, 28 corresponding to, and substantially planar with, the respective first and second surfaces 25, 27 of the first structural member 34a. The structural assembly includes a weld joint or weld bead 36, which joins the first and second structural members 34a, b. As described above, the weld bead 36 is formed by irradiating the first and second structural members 34a, b with a high-energy source, such as an electron beam, a laser or a plasma arc, such that at least one surface 37 of the weld joint is substantially planar with the first surfaces 25, 26 of the first and second structural members 34a, b and such that no further processing of the weld joint is necessary to create the substantially planar surface of the weld joint 36. Preferably, the weld bead 36 also defines a second surface 42 corresponding to and substantially planar with the second surfaces 27, 28 of the first and second structural members 34a, b.

Advantageously, as illustrated in FIG. 4C, a substantially consumed weld land 40 or weld bead 36 can be finished, if necessary, by glazing both sides of the weld bead 36 with a laser, as opposed to machining the weld bead, to remove any remaining stress concentration details and thereby provide a smooth finished surface having improved fatigue characteristics. The laser beam can be generated from one of many commercially available lasers, such as a Hoss 3 kW Nd:YAG Laser installed on a Fanuc M 710 I; 6 Axis NC controlled robot. Thus, the substantially consumed weld land 40 eliminates the post-weld machining step thereby reducing the overall manufacturing costs of the structural assembly 32.

Figure 6A:
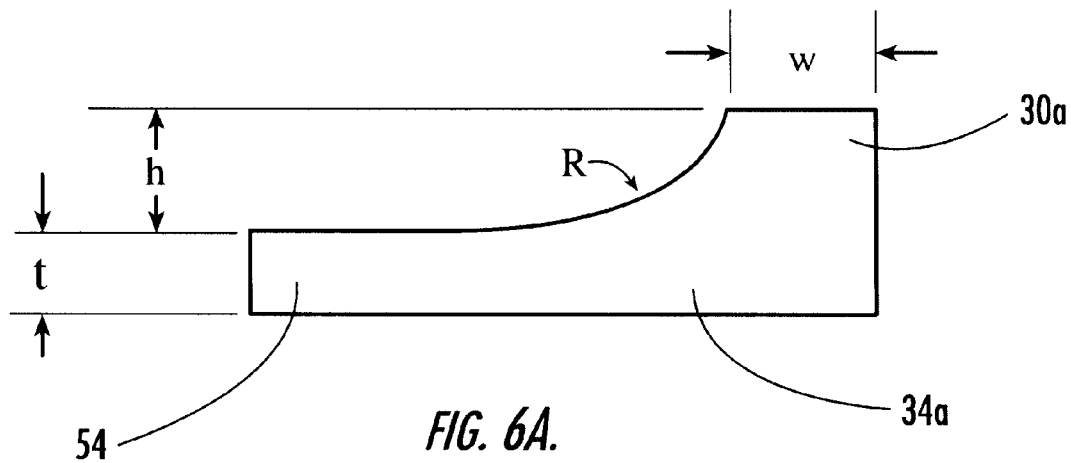
FIG. 6A is a cross-sectional view defining relevant variables and illustrating a first structural member, according to one embodiment of the present invention.
Figure 6B:
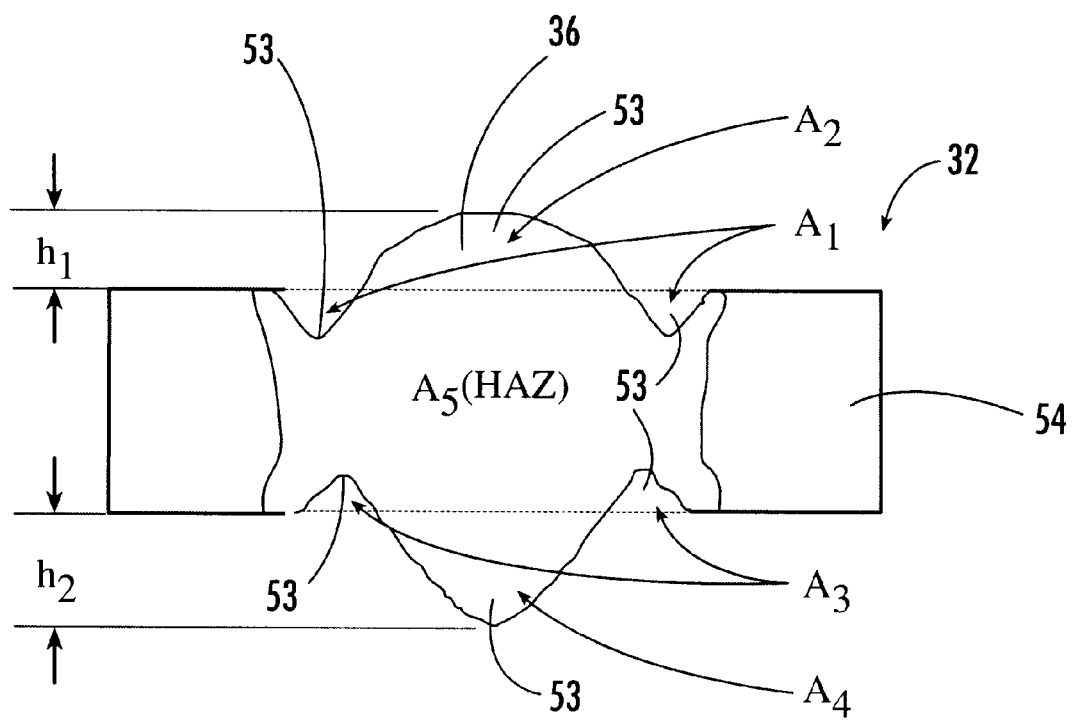
FIG. 6B is a cross-sectional view defining relevant variables and illustrating a structural assembly having a consumed weld land, according to one embodiment of the present invention.

The shape and dimensions of the consumable weld land 40 and, thus, the raised portions 30a, b defined by the first and second structural members 34a, b, are based primarily upon the shape and dimensions of the first and second structural members. FIGS. 6A, 6B, 6C, and 6D illustrate the steps for determining the optimum dimensions of a substantially consumable weld land 40, according to one embodiment of the present invention, such that the volume of material represented by the weld land is utilized to fill any underfill or undercut in the autogenous weld bead 36. Referring to FIGS. 4A and 6A, there is illustrated one embodiment of a first structural member 34a comprising a plate 54 having a width (not shown), length L and a thickness t. The plate 54 defines a raised portion 30a having a width w, height h, and radius R. As discussed above, prior to welding the first and second structural members 34a, b to form the structural assembly 32, the first raised portion 30a of the first structural member is positioned adjacent to the second raised portion 30b of the second structural member to define an interface 39 between the structural members and to define the consumable weld land 40. As illustrated in FIGS. 4B and 6B, the first and second structural members 34a, b are then joined together to form a structural assembly 32 by irradiating the first and second structural members 32 with a high-energy source along the interface 39 to thereby substantially consume the weld land 40. After welding the consumable weld land 40, there may exist minor stress concentration details 53 having an area designated $A_1$ and $A_3$, respectively, in the weld bead 36 of the structural assembly 32. As discussed above and illustrated in FIG. 4C, the weld bead 36 formed by the substantially consumed weld land 40 can be finished by glazing both sides of the weld bead 36 with a laser, as opposed to machining the weld bead, to remove any remaining minor stress concentration details and thereby provide a smooth finished surface having improved fatigue characteristics.

Figure 6D:
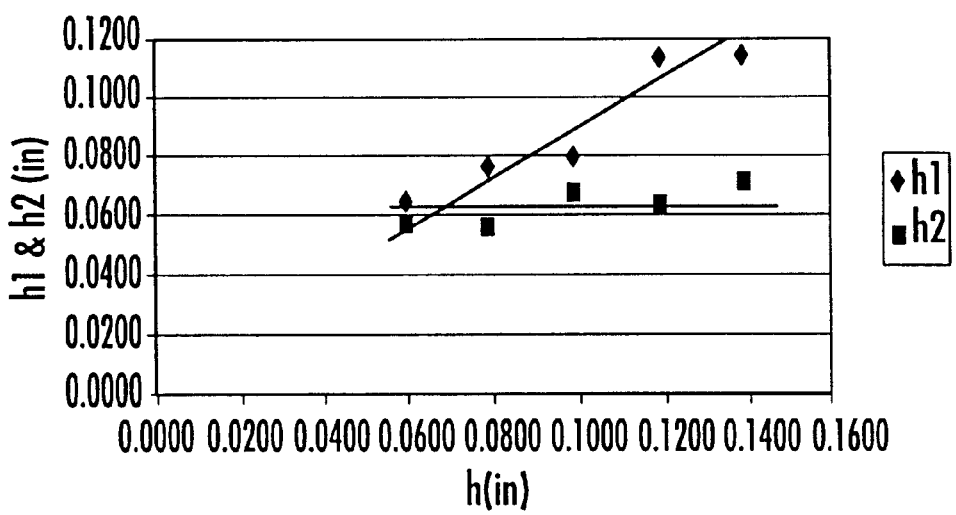
FIGS. 6D and 6J–6M are graphs illustrating the relationship between the height h of the consumable weld land and the resultant height $h_1$, $h_2$ of any remaining stress concentration details in the weld bead of FIG. 6B.

FIG. 6C illustrates a square butt weld matrix for thirty-four specimens of the first and second structural members 34a, b illustrated in FIGS. 4A and 6A in which the thickness t of the structural members and the height h, width w and radius R of the raised portions 30a, b were varied as indicated. The first and second structural members were joined by full-penetration autogenous electron beam welding to form the structural assembly 32 illustrated in FIG. 6B. Referring to FIG. 6D, there is illustrated graphically the relationship between the height h of the consumable weld land 40 shown in FIG. 4A and the resultant height $h_1$, $h_2$ of any remaining stress concentration details 53 in the weld bead 36 shown in FIG. 6B, where the thickness t of the structural members 34a, b was maintained constant at approximately t=0.4 inches (10.16 mm); and the width w and radius R of the raised portions 30a, b were maintained constant at approximately w=0.05 inches (1.27 mm) and R=0.25 inches (6.35 mm). FIGS. 6J, 6K, 6L, and 6M illustrate similar graphical relationships between the height h of the consumable weld land 40 shown in FIG. 4A and the resultant height $h_1$, $h_2$ of any remaining stress concentration details 53 in the weld bead 36 shown in FIG. 6B for other constant values of thickness t, width w and radius R.

Figure 6E:
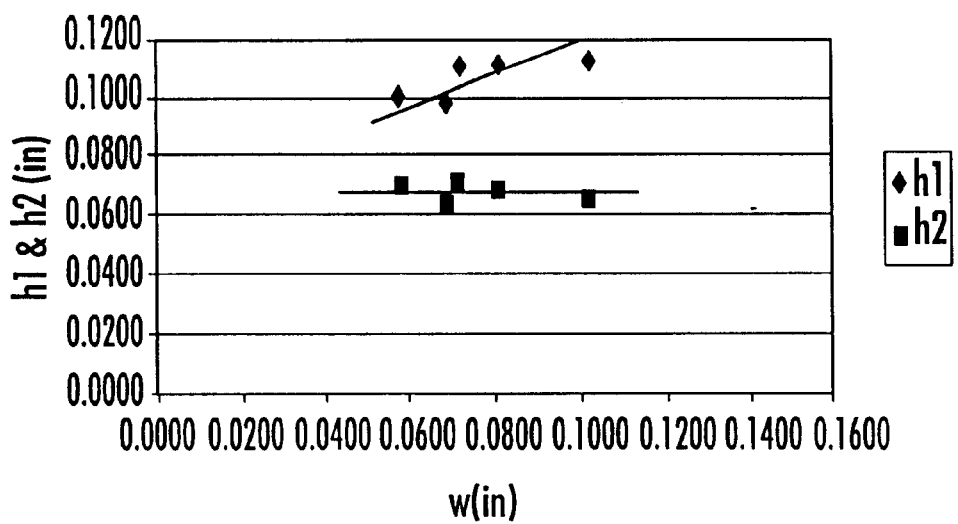
FIGS. 6E and 6N are graphs illustrating the relationship between the width w of the consumable weld land and the resultant height $h_1$, $h_2$ of any remaining stress concentration details in the weld bead of FIG. 6B.

Similarly, FIG. 6E illustrates graphically the relationship between the width w of the consumable weld land 40 shown in FIG. 4A and the resultant height $h_1$, $h_2$ of any remaining stress concentration details 53 in the weld bead 36 shown in FIG. 6B, where the thickness t of the structural members 34a, b was maintained constant at approximately t=0.4 inches (10.16 mm); and the height h and radius R of the raised portions 30a, b were maintained constant at approximately h=0.1 inches (2.54 mm) and R=0.25 inches (6.35 mm). FIG. 6N illustrates a similar graphical relationship between the width w of the consumable weld land 40 shown in FIG. 4A and the resultant height $h_1$, $h_2$ of any remaining stress concentration details 53 in the weld bead 36 shown in FIG. 6B, where the thickness t of the structural members 34a, b was maintained constant at approximately t=0.1 inches (10.16 mm); and the height h and radius R of the raised portions 30a, b were maintained constant at approximately h=0.04 inches (2.54 mm) and R=0.25 inches (6.35 mm).

Figure 6F:
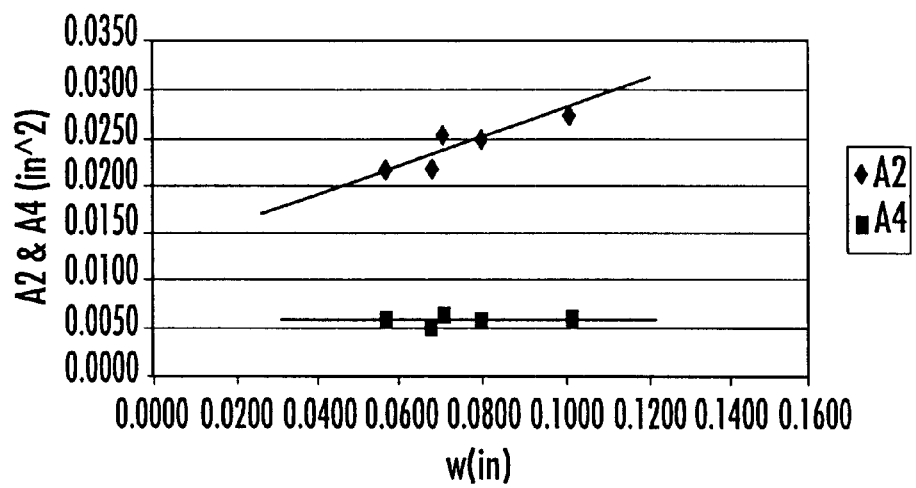
FIG. 6F is a graph illustrating the relationship between the width w of the consumable weld land and the areas $A_2$ and $A_4$ of any remaining stress concentration details in the weld bead in FIG. 6B.

FIG. 6F illustrates graphically the relationship between the width w of the consumable weld land 40 shown in FIG.

4A and the areas $A_2$ and $A_4$ of any remaining stress concentration details 53 in the weld bead 36 shown in FIG. 6B, where the thickness t of the structural members 34*a, b* was maintained constant at approximately t=0.4 inches (10.16 mm); and the height h and radius R of the raised portions 30*a, b* were maintained constant at approximately h=0.1 inches (2.54 mm) and R=0.25 inches (6.35 mm).

Figure 6G:
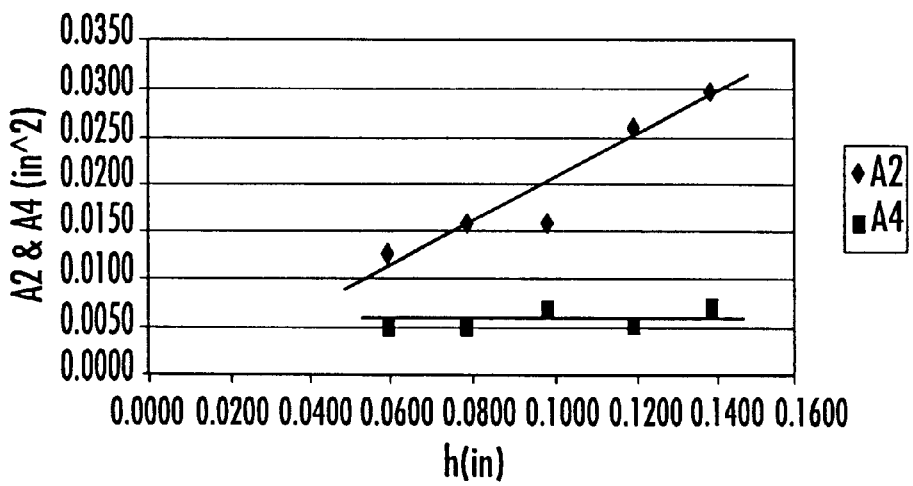
FIGS. 6G and 6O–6Q are graphs illustrating the relationship between the height h of the consumable weld land and the areas $A_2$ and $A_4$ of any remaining stress concentration details in the weld bead illustrated in FIG. 6B.
Figure 6H:
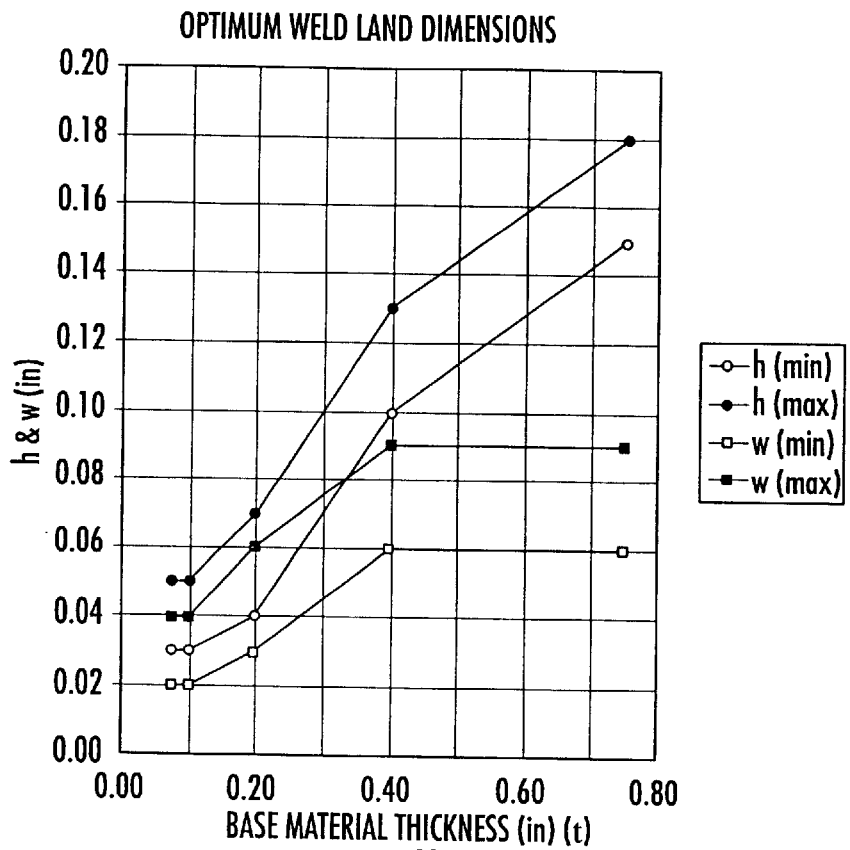
FIG. 6H is a graph illustrating the optimum height h and width w for the consumable weld land having the shape illustrated in FIG. 4B.
Figure 6I:
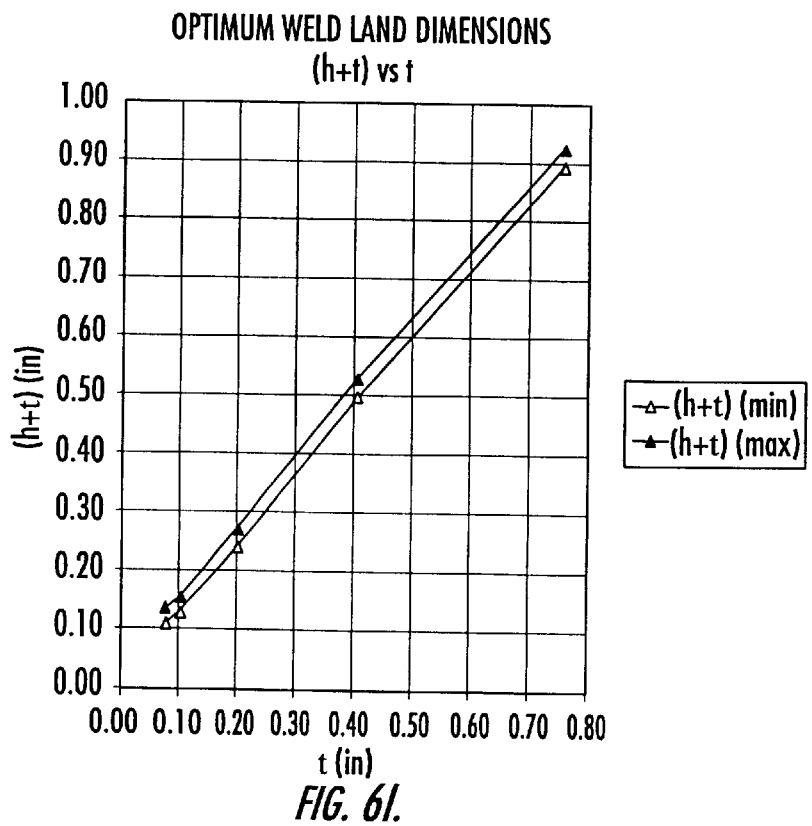
FIG. 6I is a graph illustrating the optimum total thickness (h+t) of the weld land and base material illustrated as a function of the thickness t of the first and second structural members illustrated in FIG. 4A.
Figure 6J:
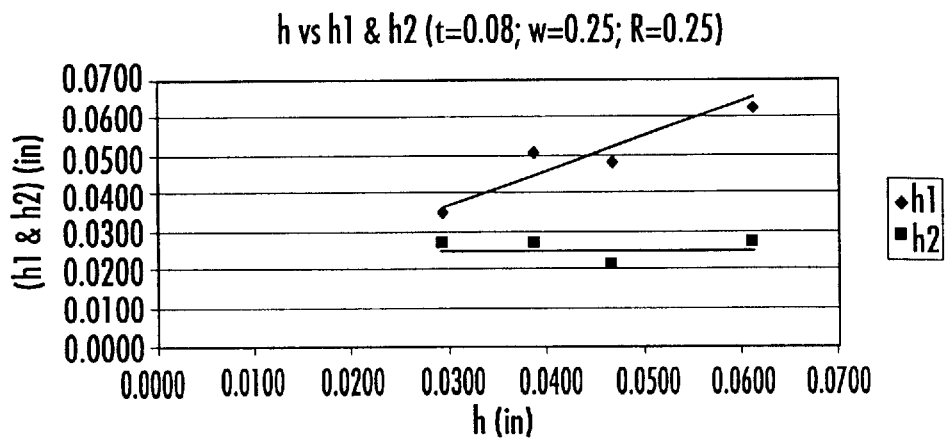
Figure 6K:
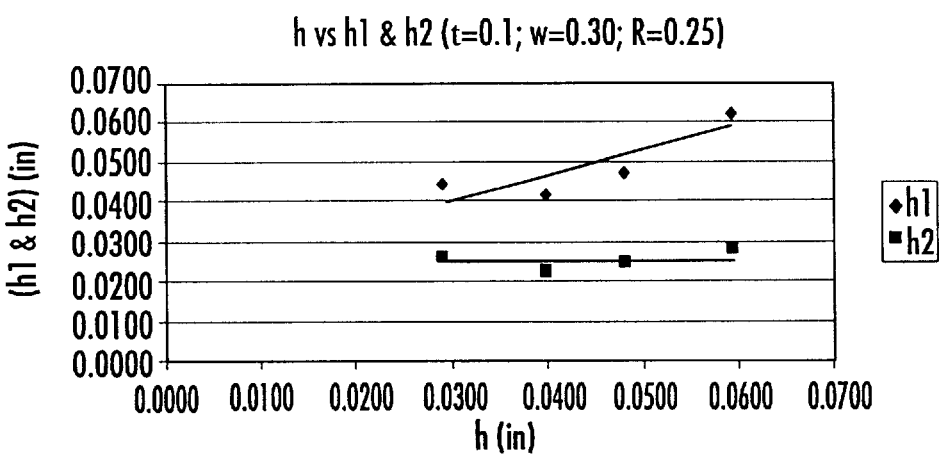
Figure 6L:
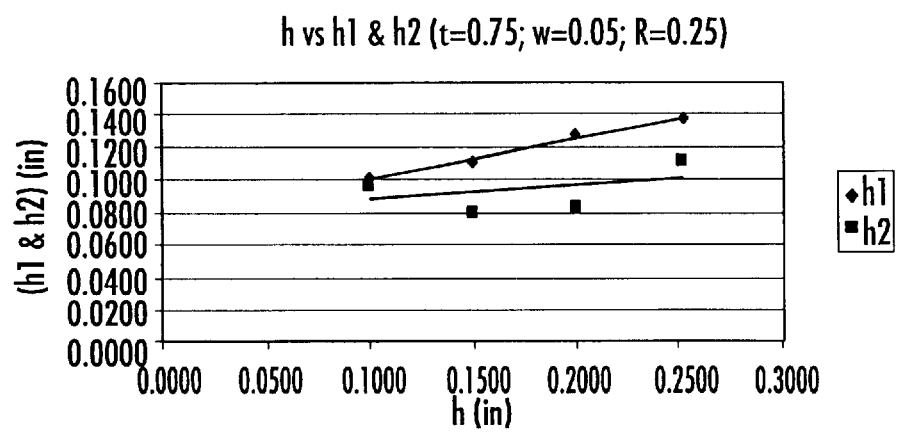
Figure 6M:
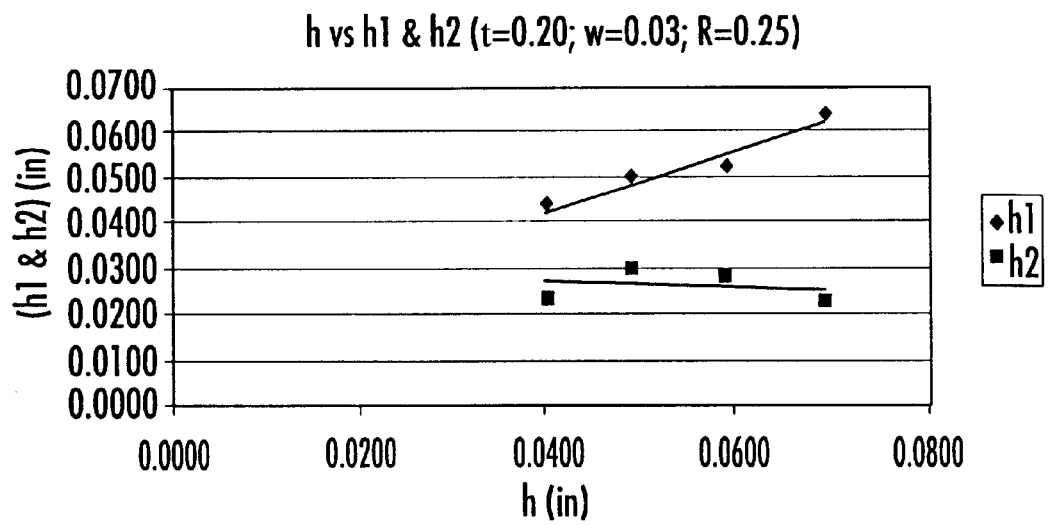
Figure 6N:
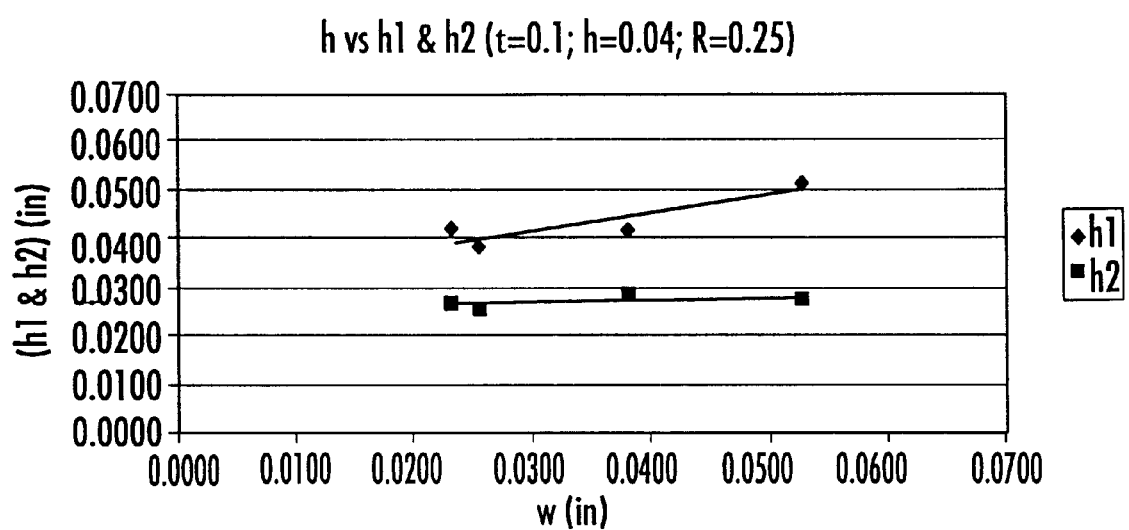
Figure 6O:
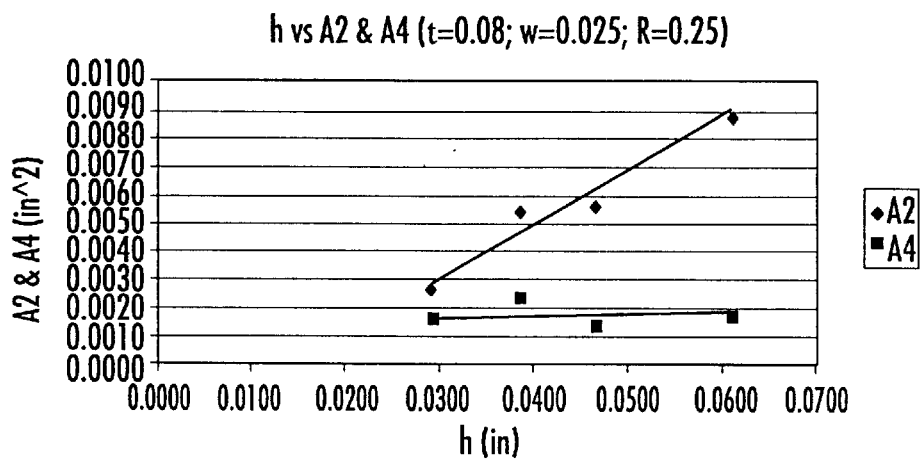
Figure 6P:
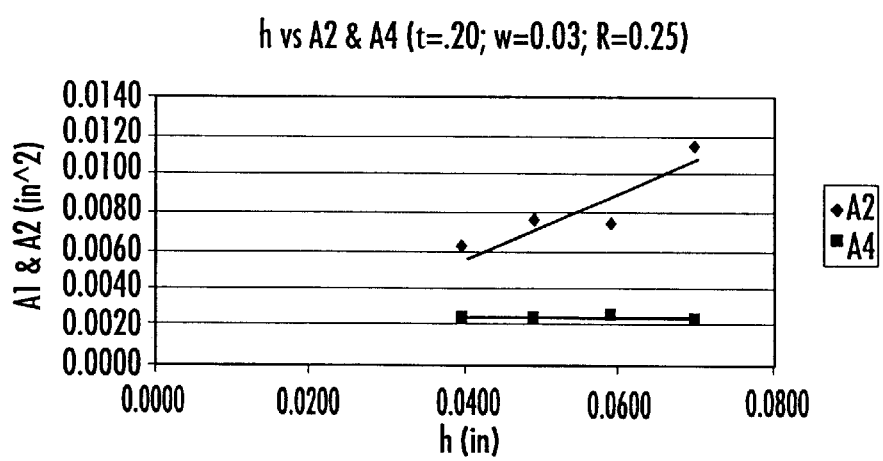
Figure 6Q:
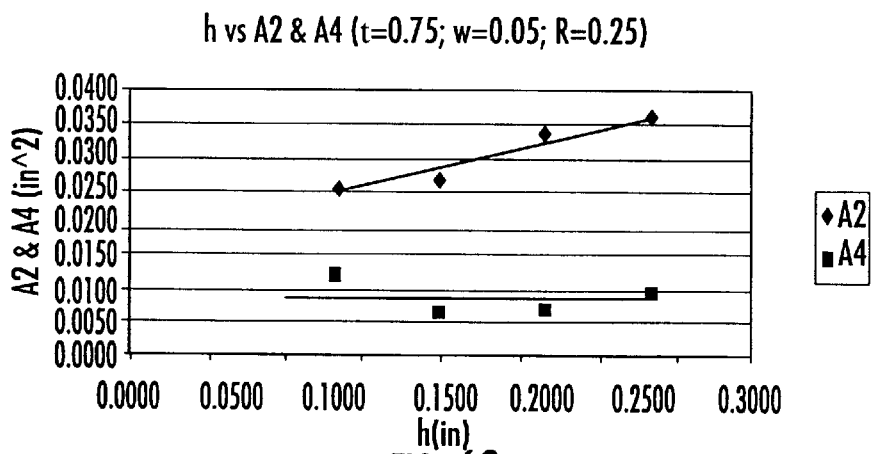

FIG. 6G illustrates graphically the relationship between the height h of the consumable weld land 40 shown in FIG. 4A and the areas $A_2$ and $A_4$ of any remaining stress concentration details 53 in the weld bead 36, where the thickness t of the structural members 34*a, b* was maintained constant at approximately t=0.4 inches (10.16 mm); and the width w and radius of curvature R of the raised portions 30*a, b* were maintained constant at approximately w=0.05 inches (1.27 mm) and R=0.25 inches (6.35 mm). FIGS. 6O, 6P, and 6Q illustrate similar graphical relationships between the height h of the consumable weld land 40 shown in FIG. 4A and the areas $A_2$ and $A_4$ of any remaining stress concentration details 53 in the weld bead 36, for other constant values of thickness t, width w and radius R. From the data presented above in FIGS. 6C–6G and 6J–6Q, the optimum height h and width w for the consumable weld land can be determined. The results of these determinations are presented in FIGS. 6H and 6I.

Figure 7D:
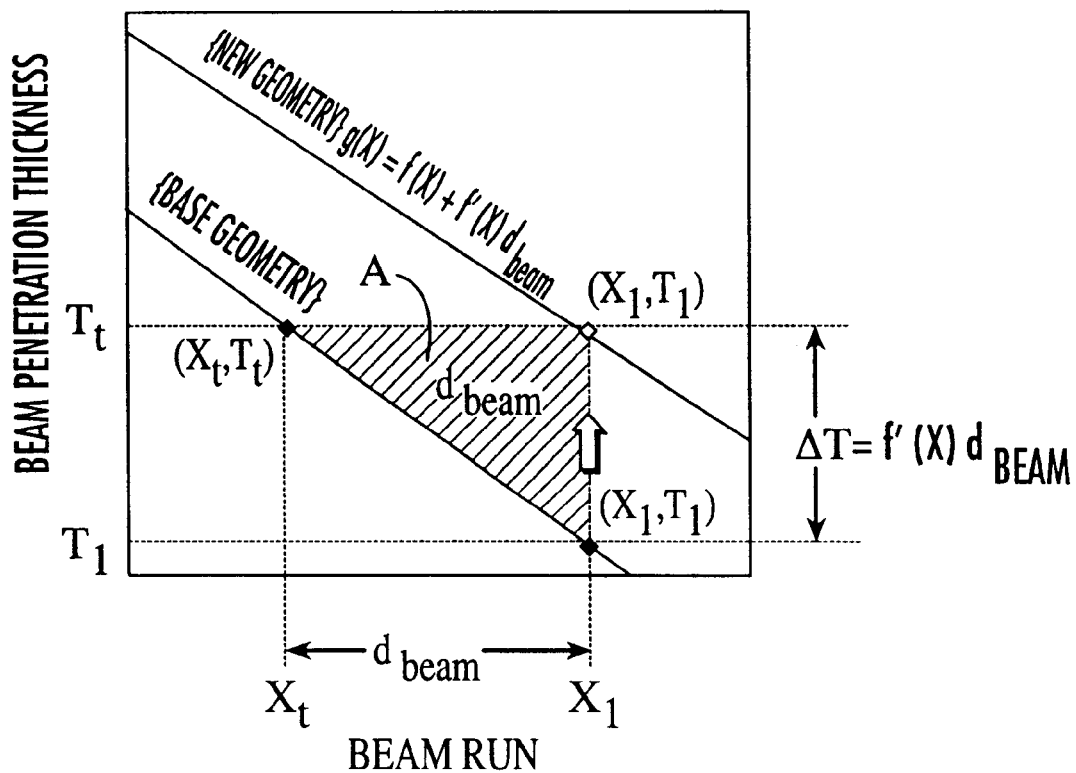
FIG. 7D is a graph illustrating the relationship between a base geometry and a new geometry that includes a substantially consumable weld land that does not produce an underfill in the base material of an autogenous electron beam weld.

FIGS. 7A, 7B, 7C, and 7D illustrate the steps for determining the approximate volume of a substantially consumable weld land 40 for a T-stiffener 44, according to another embodiment of the present invention. Referring to FIG. 7A, there is illustrated one embodiment of a T-stiffener 44 where $t_{web}=t_{stiffener}=R=1.0$ inch (2.54 cm) and h=3 inches (7.62 cm). The penetration thickness of an electron beam 10 impinging upon the surface of the T-stiffener at an angle of approximately θ=45° is summarized in FIG. 7B for the points or cuts through the structural member designated by the letters a–f along the length of the T-stiffener. The penetration thickness is measured at the center of the electron beam and is measured in the beam axis and includes the penetration of both the web 41 and stiffener 47, where applicable. At point a the penetration thickness is equal to $t_{web}/\cos(\theta)$. At points b and c the penetration thickness is equal to $(t_{web}+t_{stiffener})/\cos(\theta)$. At point d, the electron beam is tangent to the entry radius, which represents the maximum penetration thickness and corresponds to the transition from increasing thickness to decreasing thickness. At point f the penetration thickness is again equal to $t_{web}/\cos(\theta)$. This analysis of the T-stiffener does not include allowance for gaps, mismatches, material vaporization, bead fall through, beam tracking errors or spatter. However, it has been found that material vaporization is for the most part insignificant and that bead fall through is relatively consistent along the weld bead.

FIG. 7C illustrates graphically the penetration thickness T of the electron beam measured in the beam axis 10 plotted as a function of the distance the beam travels as the beam moves along the length of the T-stiffener 44, as indicated by the directional arrow 11, where the distance the beam travels is denoted the "beam run {X}." The graphical representation in FIG. 7C illustrates the transition from the region of increasing thickness for the T-stiffener 44 between points a and d to the region of decreasing thickness between points d and f. The penetration thickness of the electron beam is represented in equation (1) where, as discussed above, T is the penetration thickness along the central axis of the beam and X is in the beam run direction. An approximation of the base geometry thickness f(X) can be determined using known mathematical techniques, for example, computer aided linear regression or Fourier analysis.

$$T=f(X) \tag{1}$$

The rate of change of the electron beam penetration thickness in the base geometry T at any point can be represented by the derivative of equation (1):

$$\Delta T=f'(X) \tag{2}$$

Referring to FIG. 7D, there is illustrated a section of the curve of FIG. 7C. Using the diameter of the beam $d_{beam}$, a triangle can be constructed between the points represented by $(X_t, T_t)$, where $X_t$ is the location of the trailing edge of the electron beam and $T_t$ is the penetration thickness of the trailing edge of the electron beam, $(X_l, T_l)$, where $X_l$ is the location of the leading edge of the electron beam and $T_l$ is the penetration thickness of the leading edge of the electron beam, and $(X_l, T_t)$. This triangle represents approximately the minimum area of additional material A required to prevent underfill or undercut of the weld bead. The area of additional material A can then be multiplied by the diameter $d_{beam}$ of the electron beam to obtain the requisite volume of the consumable weld land. By performing this operation over the entire curve represented by equation (1), it is possible to generate the following equation representing the new geometry (weld land+base thickness) g(X), where C represents the material required to account for vaporization, spatter, bead fall through, etc.

$$g(X)=f(X)+f'(X)d_{beam}+C \tag{3}$$

Based upon equation (3), the dimensions of a consumable weld land can be determined for the first and second structural members.

Figure 8:
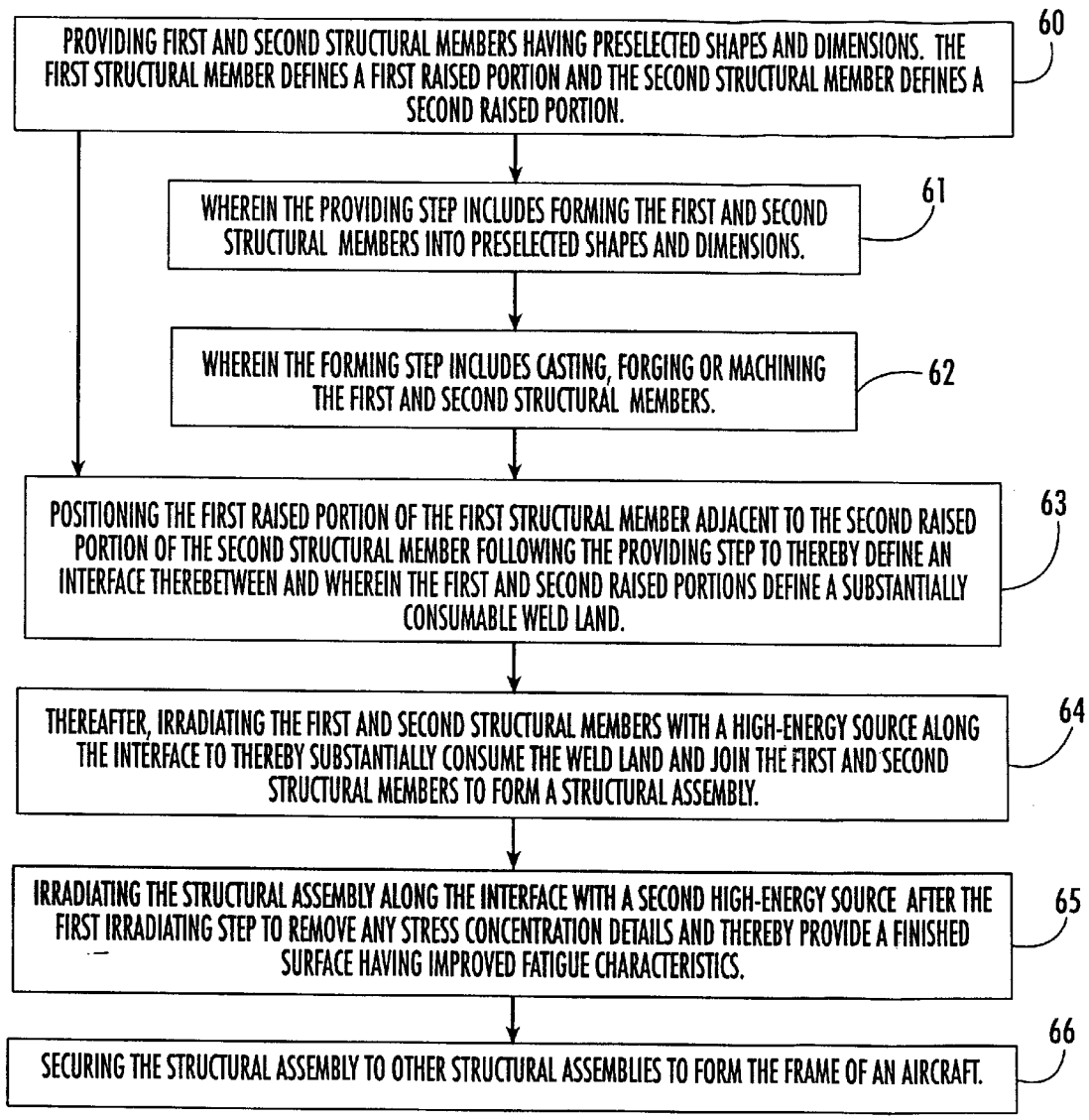
FIG. 8 is a flow chart illustrating the operations for manufacturing the structural assemblies of FIGS. 4C and 5C, according to one embodiment of the present invention.
Figure 9:
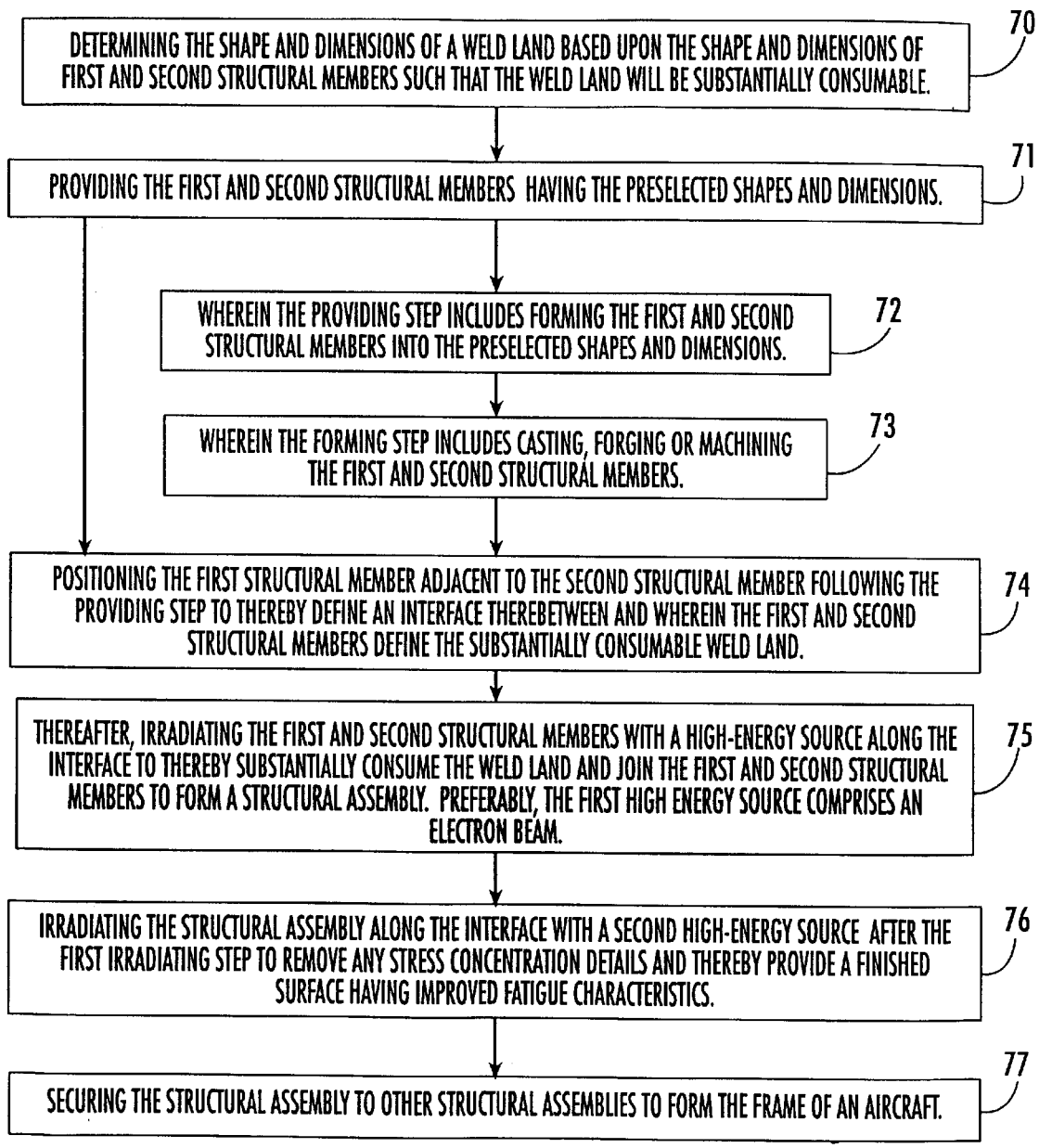
FIG. 9 is a flow chart illustrating the operations for manufacturing the structural assemblies of FIGS. 4C and 5C, according to another embodiment of the present invention.

Referring now to FIG. 8, there is illustrated the operations performed to manufacture a structural assembly according to one embodiment of the present invention. The first step includes providing first and second structural members having preselected shapes and dimensions. The first structural member defines a first raised portion and the second structural member defines a second raised portion. See block 60. According to one embodiment, the providing step includes forming the first and second structural members into preselected shapes and dimensions. See block 61. The forming step can include casting, forging or machining the first and second structural members. See block 62. The first raised portion of the first structural member is positioned adjacent to the second raised portion of the second structural member following the providing step to thereby define an interface therebetween and wherein the first and second raised portions define a substantially consumable weld land. See block 63. Thereafter, the first and second structural members are irradiated with a high-energy source along the interface to thereby substantially consume the weld land and join the first and second structural members to form a structural assembly. See block 64. Advantageously, the consumed weld land does not require a post-weld mechanical machining step in order to provide a finished surface. According to one embodiment, the structural assembly is irradiated along the interface with a second high-energy source after the first irradiating step to remove any stress concentration details and thereby provide a finished surface having improved fatigue characteristics. See block 65. The structural assembly can then be secured to other structural assemblies to form the frame of an aircraft. See block 66.

According to another embodiment, the method of manufacturing the structural assembly includes the steps of determining the shape and dimensions of a weld land based upon the shape and dimensions of first and second structural members such that the weld land will be substantially consumable. See block 70. The first and second structural members are then provided having the preselected shapes and dimensions. See block 71. According to one embodiment, the providing step includes forming the first and second structural members into the preselected shapes and dimensions. See block 72. The forming step can include casting, forging or machining the first and second structural members. See block 73. The first structural member is then positioned adjacent to the second structural member following the providing step to thereby define an interface therebetween and wherein the first and second structural members define the substantially consumable weld land. See block 74. Thereafter, the first and second structural members are irradiated with a high-energy source along the interface to thereby substantially consume the weld land and join the first and second structural members to form a structural assembly. Preferably, the first high-energy source comprises an electron beam. See block 75. According to one embodiment, the structural assembly is irradiated along the interface with a second high-energy source after the first irradiating step to remove any stress concentration details and thereby provide a finished surface having improved fatigue characteristics. See block 76. The structural assembly can then be secured to other structural assemblies to form the frame of an aircraft. See block 77.

Accordingly, there has been provided a method of manufacturing a structural assembly allowing for the efficient construction of aircraft structural assemblies, which requires less stock material and takes less time to manufacture and assemble. It has been estimated that the consumable weld land of the present invention will reduce the overall manufacturing costs of structural assemblies by approximately forty percent in terms of reduced material usage and labor and tooling expenses. Additionally, the resultant structural assemblies include an autogenous weld having high mechanical strength and structural rigidity Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A structural assembly, comprising:

a first structural member defining a first surface;

a second structural member positioned adjacent said first structural member, said second structural member defining a first surface corresponding to and substantially planar with said first surface of said first structural member; and a weld joint which joins said first and second structural members, said weld joint comprises only a substantially consumed weld land defined by said first and second structural members without underfilling or undercutting, said weld joint being formed by irradiating said first and second structural members with a high-energy source such that a surface of said weld joint is substantially planar with said first surfaces of said first and second structural members and such that no further processing of said weld joint is necessary to create said substantially planar surface of said weld joint.

2. The structural assembly of claim 1 wherein said first and second structural members each define corresponding second surfaces, and wherein said weld joint defines a second surface corresponding to and substantially planar with said second surfaces of said first and second structural members.

3. The structural assembly of claim 1 wherein said first and second structural members each comprises a member selected from the group consisting of a plate, a stiffener and a tubular member.

4. The structural assembly of claim 1 wherein said first and second structural members are formed of materials selected from the group consisting of aluminum, an aluminum alloy, titanium and a titanium alloy.

5. A structural assembly formed by consuming a weld land, comprising:

a first structural member defining a first surface;

a second structural member positioned adjacent said first structural member, said second structural member defining a first surface corresponding to and substantially planar with said first surface of said first structural member; and a weld joint which joins said first and second structural members, said weld joint comprising only a substantially consumed weld land defined by said first and second structural members without underfilling or undercutting, said weld joint being formed by irradiating said first and second structural members with a high energy source so as to substantially consume the weld land defined thereon and wherein a surface of said weld joint is substantially planar with said first surfaces of said first and second structural members.

6. The structural assembly of claim 5 wherein said first and second structural members each define corresponding second surfaces, and wherein said weld joint defines a second surface corresponding to and substantially planar with said second surfaces of said first and second structural members.

7. The structural assembly of claim 5 wherein said first and second structural members each comprises a member selected from the group consisting of a plate, a T-stiffener and a tubular member.

8. The structural assembly of claim 5 wherein said first and second structural members are formed of materials selected from the group consisting of aluminum, an aluminum alloy, titanium and a titanium alloy.

9. A structural assembly comprising first and second structural members and a weld joint which joins said first and second structural members, said weld joint comprising only a substantially consumed weld land defined by said first and second structural members without underfilling or undercutting, the structural assembly being manufactured by a process comprising the steps of:

providing first and second structural members, wherein the first structural member defines a first raised portion and the second structural member defines a second raised portion;

positioning the first raised portion of the first structural member adjacent to the second raised portion of the second structural member following said providing step to thereby define an interface therebetween and wherein the first and second raised portions define a substantially consumable weld land; and thereafter, irradiating the first and second structural members with a high-energy source along the interface to thereby substantially consume the weld land and join the first and second structural members to form a structural assembly.

10. A structural assembly manufactured according to the process of claim 9 wherein the high-energy source comprises a source selected from the group consisting of an electron beam and a laser.

11. A structural assembly manufactured according to the process of claim 9, further comprising irradiating the structural assembly along the interface with a second high-energy source after said first irradiating step to remove any stress concentration details and thereby provide a finished surface having improved fatigue characteristics.

12. A structural assembly manufactured according to the process of claim 11 wherein the second high-energy source comprises a laser.

13. A structural assembly manufactured according to the process of claim 9 wherein the first and second structural members each comprises a member selected from the group consisting of a plate, a T-stiffener and a tubular member.

14. A structural assembly manufactured according to the process of claim 9 wherein said providing step comprises forming the first and second structural members.

15. A structural assembly manufactured according to the process of claim 14 wherein said forming step comprises a method selected from the group consisting of casting, forging and machining.

16. A structural assembly manufactured according to the process of claim 9 wherein the first and second structural members are formed of materials selected from the group consisting of aluminum, an aluminum alloy, titanium and a titanium alloy.

17. A structural assembly manufactured according to the process of claim 9 further comprising securing the structural assembly to other structural assemblies to form the frame of an aircraft.

18. A structural assembly manufactured according to the process of claim 9 further comprising determining the shape and dimensions of the weld land based upon the shape and dimensions of the first and second structural members such that the weld land will be substantially consumable.

\* \* \* \* \*